US005499311A

United States Patent [19]
DeCusatis

[11] Patent Number: 5,499,311
[45] Date of Patent: Mar. 12, 1996

[54] RECEPTACLE FOR CONNECTING PARALLEL FIBER OPTIC CABLES TO A MULTICHIP MODULE

[75] Inventor: Casimer M. DeCusatis, Poughkeepsie, N.Y.

[73] Assignee: International Business Machines Corporation, Armonk, N.Y.

[21] Appl. No.: 357,805

[22] Filed: Dec. 16, 1994

[51] Int. Cl.[6] ....................................................... G02B 6/43
[52] U.S. Cl. .............................................. 385/89; 385/88
[58] Field of Search ........................... 385/31, 14, 88–94, 385/76

[56] References Cited

U.S. PATENT DOCUMENTS

| | | | |
|---|---|---|---|
| 5,333,225 | 7/1994 | Jacobowitz et al. | 385/93 |
| 5,337,388 | 8/1994 | Jacobowitz et al. | 385/76 |
| 5,396,573 | 3/1995 | Ecker et al. | 385/88 |

Primary Examiner—John D. Lee
Assistant Examiner—Phan T. H. Palmer
Attorney, Agent, or Firm—Lawrence D. Cutter

[57] ABSTRACT

A fiber optic receptacle for connecting standard fiber optic cable plug connectors with a multi-chip circuit module includes a surrounding non-insulative jacket having a thermal expansion joint. The jacket is preferably disposed in a recess along the edge of the multi-chip module substrate and is affixed thereto by means of solder ball technology so as to provide alignment and connection to grounding conductors. Internal fiber optic cables extend from the bottom of a recess in a receiving body which is surrounded by the non-insulative jacket. These internal optical fibers are coupled to fiber optic cables in an external plug connector with photonic receptors being present on selected circuit chips disposed on the multi-chip module structure. The connector structure solves problems of alignment, manufacturability, thermal expansion, bandwidth and compatibility in addition to problems associated with the dissipation of accumulated static charge.

20 Claims, 3 Drawing Sheets

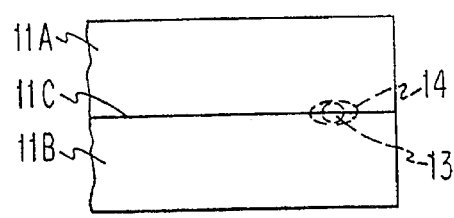
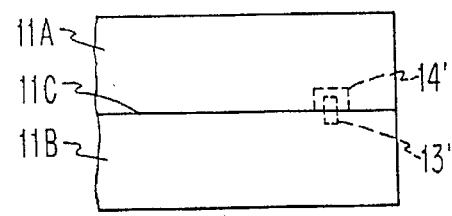
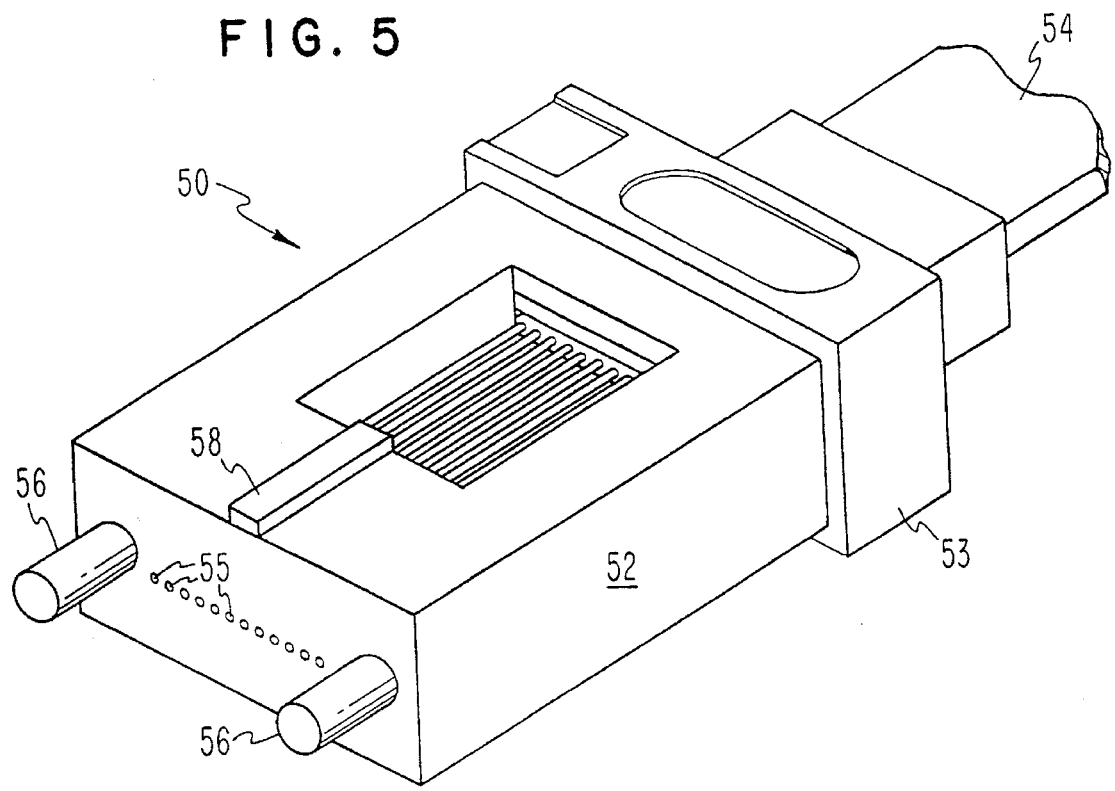

RECEPTACLE FOR CONNECTING PARALLEL FIBER OPTIC CABLES TO A MULTICHIP MODULE

BACKGROUND OF THE INVENTION

The present invention is generally directed to a system for providing optical fiber connections to multi-chip electronic circuit modules. More particularly, the present invention is directed to a connector and a module/connector combination which is capable of providing optical fiber connections to chips on a multi-chip module through the utilization of standardly available fiber optic cable connectors. Even more particularly, the present invention is directed to a mechanism for providing plugable connections between exterior fiber optic cable packages and electronic circuit chips disposed on an interior substrate. These chips include communication means for generating and/or receiving optical fiber transmission signals. The problems associated with connecting fiber optic cable bundles and ribbon packages to multi-chip circuit modules are discussed in U.S. Pat. No. 5,337,388 issued Aug. 9, 1994 and also in U.S. Pat. No. 5,333,225 issued Jul. 26, 1994. Both of these patents are assigned to the same assignee as the present application.

The problems encountered in trying to establish the above described opto-electronic connections are generally severest with respect to the problem of aligning hair-thin fiber optic cables with corresponding cables in the connector, and with providing connections from the connector to individual circuit chips. The problem of alignment is exacerbated by changes in dimensioning produced by thermal effects. These thermal effects arise from the heat that is generated within the electronic circuit chip components. The thermal problems are worsened by operation of these circuit chips at high frequencies, which are necessary to provide fast circuit operation but which generate large amounts of heat. This is particularly true in electronic components that are part of computer systems.

In addition to the problems associated with thermal expansion, another problem encountered in attempting to provide a suitable connector is the problem of electrical isolation. Because electrostatic charges can accumulate on fiber optic cables and on other associated plastic and insulative components, it is very desirable to provide a mechanism by which such static discharges may be dissipated without causing injury to electronic circuit components which can be particularly sensitive to static discharge.

Additionally, it is noted that a connector which mates optical fiber cables to the interior of multi-chip modules should also provide a mechanism for environmental isolation of the circuit chips from the exterior environment. In particular, it is typically desirable to operate a multi-chip module (MCM) in a variety of atmospheric conditions which may include above average levels of relative humidity, dust and/or particulate contamination. These atmospheric contaminants should in general be unable to penetrate a seal designed to enclose a multi-chip module. Furthermore, the connector should be compatible with sealing and cooling arrangements which permit chip cooling mechanisms to be employed.

In short, it is seen that a cable connector for the present purposes should be compatible with chip protection from contamination while nonetheless being immune from thermal expansion effects and yet providing electrostatic isolation for circuit chips inside the module.

SUMMARY OF THE INVENTION

In accordance with a preferred embodiment of the present invention, a receptacle for a fiber optic cable connector comprises a plastic connector receiving body with a recess for receiving a fiber optic cable connector. This body is at least partially surrounded by a non-insulative jacket which possesses a thermal expansion joint. A plurality of optical fibers are disposed within the recess of the receiving body so as to extend from the bottom of the recess to provide external connectivity. In a preferred embodiment of the present invention, the jacket comprises a material such as silicon, since silicon is compatible with manufacturing processes involving the placement of silicon chips on ceramic and/or glass/ceramic substrates. The recess in the receiving body preferably includes alignment holes at the bottom of the recess which are disposed so as to receive mating metal pins on standard fiber optic cable connectors. These pins and mating holes achieve the desired alignment between the optical fibers in the cable connector and the optical fibers in the receiving body which extend from the body to a photonically sensitive regions on integrated circuit chips in or on the MCM.

In accordance with a preferred embodiment of the present invention, the above described receptacle is mated with a multi-chip module (MCM) in a fashion which permits appropriate grounding to eliminate electrostatic discharge problems. Additionally, the mating of the receptacle with a multi-chip module is preferably carried out by placement of the receptacle in a recess in the side of the MCM in a fashion which nonetheless still permits the module to be sealed against environmental elements while still maintaining connection, alignment, grounding and mechanical compatibility.

Accordingly, it is an object of the present invention to provide a receptacle for connecting a fiber optic cable to the interior of a multi-chip module which has a plurality of integrated circuits therein.

It is also an object of the present invention to provide an optical fiber cable connector which may be easily grounded.

It is yet another object of the present invention to provide a fiber optic cable receptacle which is capable of thermal expansion and contraction in a fashion which does not interfere with alignment and which is at the same time operable in the face of relatively high power levels being supplied to electronic circuit chips within the module.

It is yet another object of the present invention to provide a fiber optic connector which employs plastic material in the receiving body so as to provide compatibility with industry standard fiber optic connectors.

It is another object of the present invention to provide a thermally expansive jacket for mating external optical fiber cables to electronic circuit components on a multi-chip module.

It is also an object of the present invention to provide a fiber optic cable connection between the exterior and interior of a multi-chip module without impairing the environmental seal between the interior and exterior module portions.

It is still another object of the present invention to increase the information bandwidth for transmission of information into and out of multi-chip electronic circuit modules.

Lastly, but not limited hereto, it is an object of the present invention to provide a fiber optic connection system between the interior and exterior of a multi-chip module while at the same time providing electrostatic discharge grounding means, and particularly to provide such grounding means which are compatible with MCM production and processing.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIGS. 4A and 4B are side elevation views illustrating the utilization of ball-in-hole and pin-type positioning mechanisms, respectively, which may be employed in the jacket surrounding the receptacle body for purposes of alignment and positioning of the jacket;

FIG. 5 is an isometric view illustrating a standard type connector plug which is meant to be accommodated by the receptacle described herein.

DETAILED DESCRIPTION OF THE INVENTION

Figure 1:
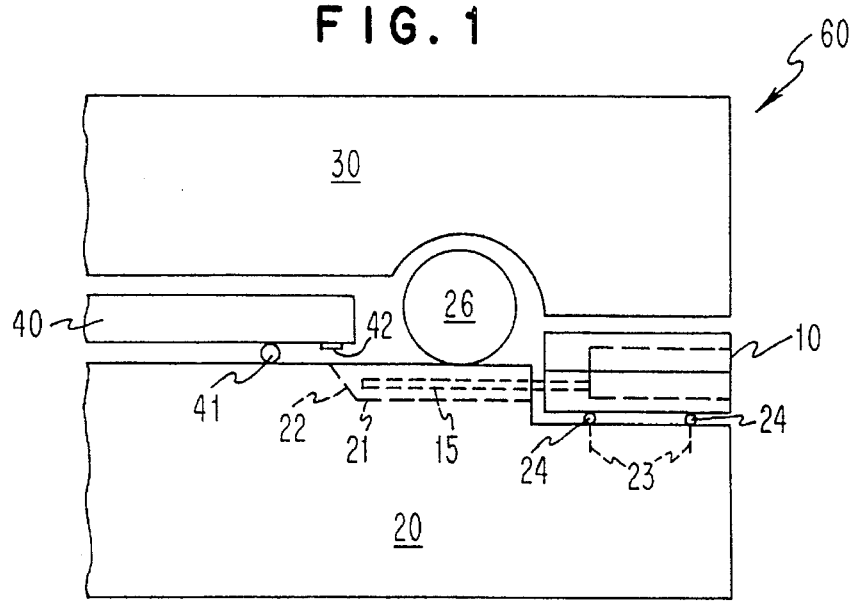
FIG. 1 is a partially cross-sectional side elevation view illustrating the fiber optic receptacle of the present invention in position in a multi-chip module.
Figure 2:
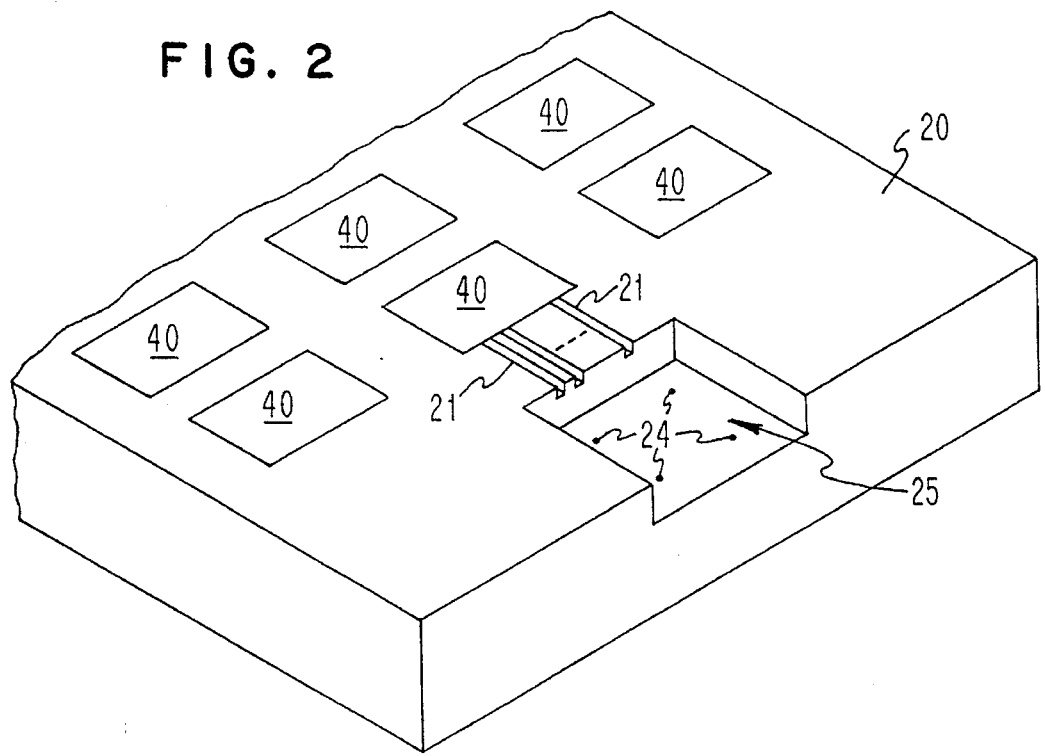
FIG. 2 is a partial isometric view illustrating a multi-chip module substrate, such as that shown in FIG. 1, which has been fabricated to accommodate the receptacle of the present invention.

FIG. 1 illustrates receptacle 10, in accordance with the present invention, employed in a recess (reference numeral 25 in FIG. 2) in substrate 20 which is part of a multi-chip module assembly. Module 60 includes at least one semiconductor chip 40 disposed on the upper surface of substrate 20. In preferred embodiments of the present invention, chips 40 are attached to substrate 20 by means of solder balls 41. This configuration is often referred to as the "C4 technology" which disposes circuit chips on substrates in inverted positions by means of conductive metal blobs of solder which are attached to electrically conductive patterns on insulative substrate 20. Although not specifically shown (for purposes of clarity) in FIG. 1, substrate 20 includes electrically conductive patterns on the surface thereof and also typically includes conductive networks embedded within insulative substrate 20 which is typically a ceramic material but which also may comprise a glass or glassy ceramic.

For purpose of the present invention, at least one of chip 40 includes photoreceptive or phototransmissive means 42. These means operate either to receive laser light or conversely to generate optical transmissions which are conducted to the exterior of the module through receptacle 10. In preferred embodiments of the present invention, receptacle 10 is incorporated into multi-chip module with substrate 20 and cap 30 in a fashion which provides environmental isolation. This isolation is achieved at least in part by means of gasket 26 which provides a seal between substrate 20 and cap 30. In those situations where the power requirements demand it, cap 30 also preferably includes passages therein for the flow of cooling fluid therethrough. In such circumstances, cap 30 is also preferably in thermal contact with one or more chips 40 to provide the desired degree of cooling. Again, depending upon the circumstances, not all chips on a substrate need the same degree of cooling; this is typically a function of the power being generated within the chip circuits. Likewise, not all chips require photonic means 42.

Receptacle 10, of the present invention, includes an external, non-insulative jacket 11 typically including upper portion 11a and lower portion 11b (see FIGS. 4A and 4B). This jacket preferably comprises a material such as silicon because of its compatibility with other aspects of the multi-chip module manufacturing process. Accordingly, exterior jacket 11 is provided with grounding means to mitigate problems associated with electrostatic discharge conditions. In particular, jacket 11 preferably includes solder balls 24 (just as in the C4 chip mount process) which are employed to hold receptacle 10 in position in recess 25 in substrate 20. Additionally, substrate 20 is seen to preferably include ground conductors 23 which provide a direct path to ground for any charge accumulation that may be present on receptacle 10, or which may be supplied to receptacle 10 as a result of the insertion of plug 50 (see FIG. 5) into the recess in receptacle 10.

Receptacle 10 also includes optical fiber cables which extend from receiving body 12 so as to be disposable in grooves or channels 21 in substrate 20. Additionally, it is noted that these channels preferably include reflective end portion 22 which is operable to direct light from internal fiber optic leads 15 to photonic receptors 42 on chips 40. Likewise, for transmission outward, reflective groove portion 22 is also employed to direct light from chip 40 into internal fiber optic lead 15.

There are a number of ways in which the optical fibers 15 may be embedded in plastic receptacle 15; for example, the receptacle may be cast as two halves in a precision mold which includes grooves for the fiber locations, the fibers may then be placed in the grooves of one half and affixed with epoxy, and the other half may then be attached over the fibers. Basically, the plastic optical fiber receptacle may be fabricated using industry standard techniques similar to those used to fabricate the connector assembly of FIG. 5; such connectors are commercially available. When a precision mold is used to fabricate the plastic receptacle, the mold controls the fiber location within the receptacle; alignment between the receptacle and plug of FIG. 5 is accomplished by the precision metal alignment pins incorporated into the receptacle.

The construction of recess 25 and grooves or channels 21 in substrate 20 is more particularly described in U.S. Pat. No. 5,333,225 discussed above and which is incorporated herein by reference.

Figure 3A:
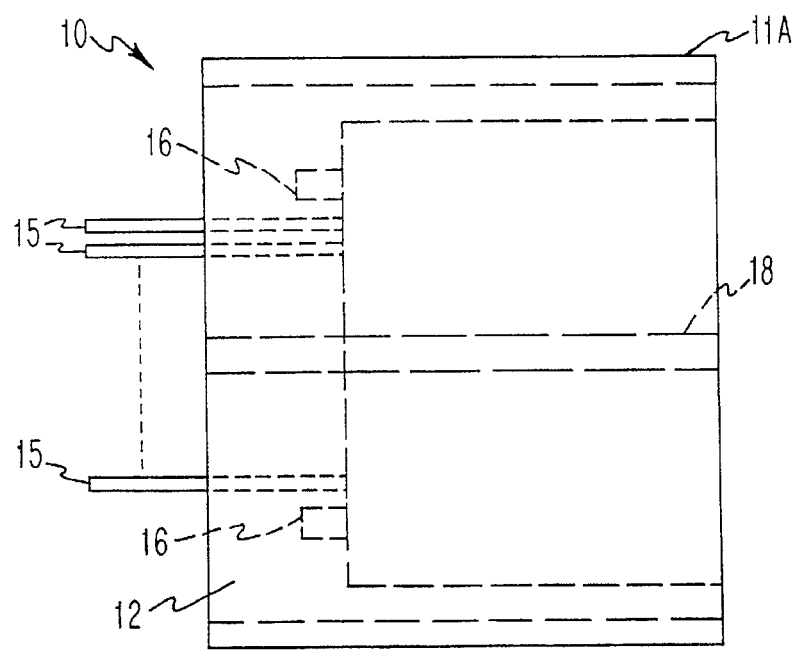
FIGS. 3A, 3B and 3C are top, side and front views of a receptacle in accordance with the present invention.
Figure 3B:
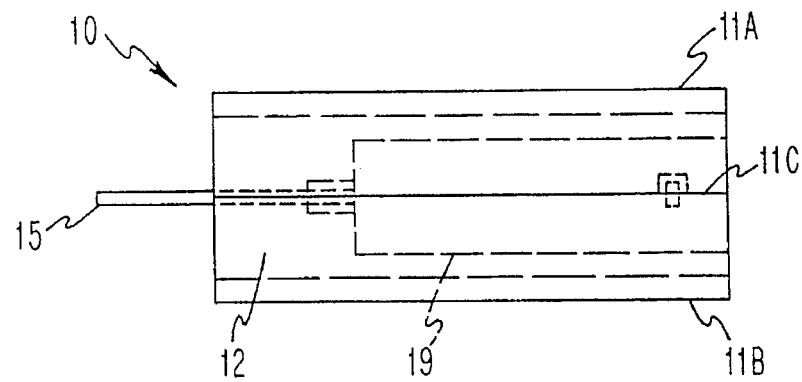
Figure 3C:
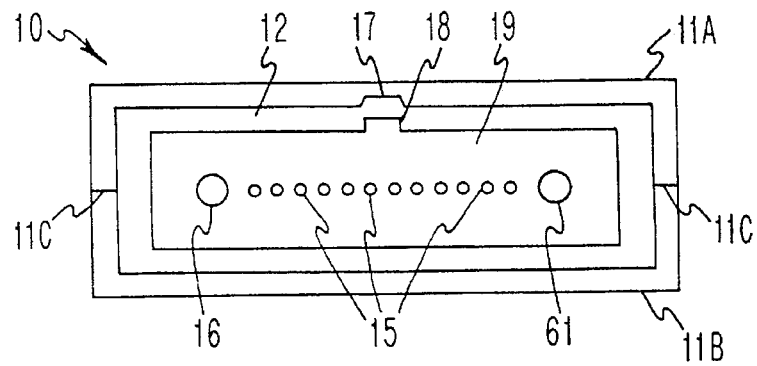

A detailed illustration of the connector of the present invention is shown in FIGS. 3A, 3B and 3C which show top, side and front views, respectively. In particular, it is seen from FIGS. 3A, 3B and 3C (collectively FIG. 3) that optical fiber leads 15 extend from the bottom of recess 19 in receiving body 12. In fact, leads 15 preferably extend slightly into recess 19. Body 12 preferably comprises a material such as plastic and in fact preferably comprises a plastic having approximately 20% carbon fill to facilitate conduction of accumulated static charge to surrounding non-insulative jacket 11 which preferably comprises a material such as silicon. Jacket 11 surrounds recess possessing body 12 and serves several significant functions. In particular, jacket 11 provides an electrically conductive path for accumulated static charge and in particular provides a direct route for their passage to ground conductive leads 23 in substrate 20. Additionally, jacket 11 includes upper portion 11a and lower portion 11b which divide jacket 11 into two pieces along thermal expansion joint 11c. Jacket 11 (collectively, upper jacket portion 11a and lower jacket portion 11b) also includes a positioning mechanism which is more particularly illustrated in FIGS. 4A and 4B discussed below.

FIG. 4 shows the ball-in-hole or pin-in-hole expansion joints within jacket 11. These features are very desirable to provide the means to align the upper and lower halves of the jacket 11a and 11b, while providing room for movement which may be caused by thermal expansion of the receptacle. If there is a change in temperature, the expansion joint moves first and the plastic receptacle "floats" inside the jacket; this allows the plastic to remain in alignment with the plug. Otherwise, if the temperature changed and the receptacle was fixed in place, there would be stress on the plastic which could cause it to deform and lose the alignment between receptacle 10 and the plug 50. Note this floating action also allows receptacle 10 to move slightly when the connector is plugged in; hence thee is less plugging force transferred from the plug to the receptacle, where it might deform the plastic (low insertion force design).

Receptacle 10 also includes connector plug receiving body 12 which preferably comprises a carbon filled plastic material. Body 12 includes recess 19 at the bottom of which there are disposed alignment holes 16 which mate with (typically metal) pins 56 on plug 50 (see FIG. 5). This provides an alignment mechanism for optical fibers 15 in plug receiving body 12 so as to align optical fibers 55 in plug 50 (see FIG. 5) with optical fibers 15. Plug receiving body 12 also preferably includes keyway 18 which mates with a corresponding key on plug 50. This key and channel provide a mechanism which precludes insertion of connector plug 50 into recess 19 in an inverted orientation. Additional alignment between jacket 11 and body 12 is provided by similar keyway structure 17 (see, FIG. 3C). While the preferred embodiment of the present invention includes pins on plug 50 and corresponding pin holes 16 at the bottom of recess 19, it is also clear that the alignment function may also be achieved by disposing pins at the bottom of recess 19 by and providing corresponding pin holes in plug 50.

In order to provide an alignment function between the two portions of conductive or semiconductive jacket 11, either a ball-in-hole arrangement is employed, as shown in FIG. 4A, or an pin-in-hole arrangement is employed, as shown in FIG. 4B. In the ball-in-hole arrangement, ball 13 is disposed in half of a substantially hemispherically indentation 14 in upper and lower jacket portions 11a and 11b. This provides alignment and spacing functions and yet nonetheless permits some differential expansion between the jacket portions. Likewise, pin 13' (as in FIG. 4B) may be fixedly disposed in lower jacket portion 11b and extend into an oversized hole 14' in upper jacket portion 11a. It is noted that, while for convenience, jacket 11 preferably comprises only two mating portions, it is nonetheless possible to partition the jacket into smaller pieces, each of which also could possess a thermal expansion joint.

The above described receptacle is designed for insertion therein of connector plug 50, which is shown in FIG. 5. Plug 50 includes array 55 of optical fibers extending from flat ribbon 54. These cables are preferably disposed linearly between alignment pins 56 in plug body 52. Plug 50 also preferably includes stop 53 which, when in position, meets flush with the front edge of receptacle 10. Plug 50 also preferably includes key 58 which is meant to be slidably insertable into key way 18 in body 12 (see FIG. 3C).

It is noted also that for purposes of strain relief, recess 19 and plug body 52 may also incorporate conventional latching means to lock plug 50 into place with sufficient strength so as to defeat the possibility of easy or accidentally pulling plug 50 from recess 19.

From the above, it should be appreciated that the present invention provides a fiber optic receptacle for coupling standard fiber optic cables to a multi-chip module. Likewise, there is disclosed the combination of a multi-chip module which incorporates the receptacle of the present invention. The system described herein, provides a plugable connector system which is not only low cost but which is easy to maintain and is highly reliable. Furthermore, the system exhibits improved noise immunity and provides a scaleable means for increasing the input/output bandwidth through the inclusion of a plurality of receptacles disposed along the edge of a multi-chip module, substantially as described herein. The present invention therefore is seen to facilitate the construction of massively parallel data and computational architectures. The present invention is also seen to provide alignment, strain relief, electrostatic immunity, noise immunity and scaleable edge connection features. It is also seen that the receptacle of the present invention further provides a mechanical float to minimize plugging forces and that it furthermore incorporates a zero insertion force design. Furthermore, it is seen that the use of a silicon jacket, together with the utilization of solder balls disposed on the outside thereof, provides the ability to use standard lithographic alignment techniques between the jacket receptacle and grounding conductors on substrate 20. The lithographic grid not only provides alignment to the grounding pads; it is the same grid that is used to align chips 42 to substrate 20. So, because we can align the chips and receptacle on the same grid, we can precisely align the optical transmitter/receivers 42 on the chip with the end faces of fibers 15 in the receptacle. Also, it is seen that the structure of the connector described herein provides compatible materials for use in conjunction with the surrounding multi-chip module. It is also seen that the solder ball contacts on the exterior of the outer jacket provides improved electrostatic discharge grounding since it provides a very short path to ground. Additionally, the fibers employed preferably protrude into the recess so as to provide direct physical contact when the connector is plugged in thus improving optical coupling without the use of index matching gels. It is also seen that the connector may employ fan out of the optical stubs from the connector to provide strain relief and additional connectivity inside the multi-chip module.

In order to provide a desirable seal between the exterior and interior of the multi-chip module, grooves or channels 21 may be back filled with any convenient polymeric material.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A receptacle for a fiber optic cable connector having a plurality of optical fibers, said receptacle comprising:

a connector receiving body having a recess therein for receiving said fiber optic cable connector, said body also having at least one alignment means disposed within said recess;

a plurality of internal optical fibers disposed within said receiving body so as to extend from the bottom of said recess to provide external connectivity, said internal optical fibers being disposed so as to align with the optical fibers in said connector; and a jacket disposed around at least a portion of said receiving body so as not to preclude access to said recess or to interfere with said plurality of internal optical fibers, said conductive jacket having a thermal expansion joint therein.

2. The receptacle of claim 1 in which said alignment means comprises at least one guide pin hole disposed at the bottom of said recess.

3. The receptacle of claim 1 in which said alignment means comprises at least one guide pin disposed at the bottom of said recess.

4. The receptacle of claim 1 in which said jacket possesses sufficient electrical conductivity to provide protection against electrostatic charge accumulation.

5. The receptacle of claim 1 in which there is further disposed a latching means in said recess to prevent inadvertent removal of said fiber optic connector from said recess.

6. The receptacle of claim 1 in which said expansion joint is of the ball-in-hole variety.

7. The receptacle of claim 1 further including ground contacting means affixed to the exterior of said jacket.

8. The receptacle of claim 7 in which said ground contacting means is a plurality of solder balls.

9. The receptacle of claim 1 further including means to prevent inverted insertion of said connector into said recess.

10. An electronic component assembly capable of exterior connection to a fiber optic cable connector, said electronic component assembly comprising:

an insulative substrate having at least one integrated circuit chip disposed thereon together with electrical conductors for the external electrical connection of said chip, said at least one chip having means disposed thereon for external optical communication;

a recess disposed at an edge of said substrate;

a jacket disposed within said recess in said substrate, said jacket having a thermal expansion joint therein;

a connector receiving body having a recess therein for receipt of said fiber optic cable connector, said connector receiving body being at least partially surrounded by said jacket; and fiber optic cables extending from the bottom of said recess in said receiving body to at least one of said external optical communication means on at least one chip.

11. The component assembly of claim 10 further including alignment means disposed at the bottom of said recess.

12. The component assembly of claim 11 in which said alignment means comprises at least one guide pin hole disposed at the bottom of said recess.

13. The component assembly of claim 11 in which said alignment means comprises at least one guide hole disposed at the bottom of said recess.

14. The component assembly of claim 10 in which said jacket possesses sufficient electrical conductivity to provide protection against electrostatic charge accumulation.

15. The component assembly of claim 10 in which there is further disposed a latching means in said recess to prevent inadvertent removal of said fiber optic connector from said recess.

16. The component assembly of claim 10 in which said expansion joint is of the ball-in-hole variety.

17. The component assembly of claim 10 further including ground contacting means affixed to the exterior of said jacket.

18. The component assembly of claim 10 in which said ground contacting means is a plurality of solder balls.

19. The component assembly of claim 10 further including means to prevent inverted insertion of said connector into said recess.

20. The component assembly of claim 10 in which said jacket comprises a carbon filled plastic.

* * * * *